Figure 1:
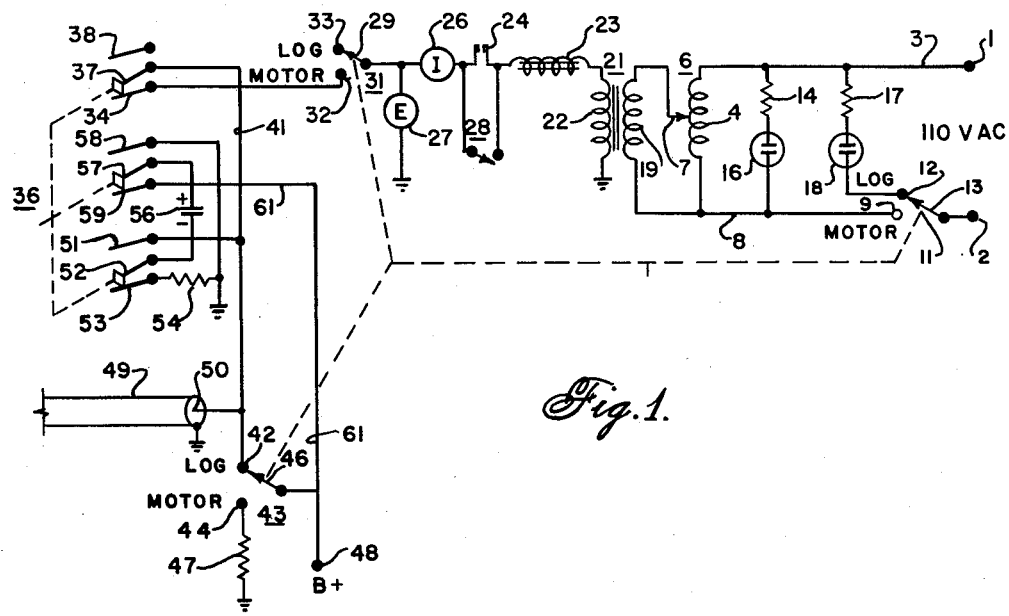

Oct. 30, 1962   M. B. BROOME   3,061,734

WELL LOGGING CALIPER MOTOR CONTROL SYSTEM

Filed Sept. 11, 1959

INVENTOR.
MARSHALL B. BROOME
BY
Robert K. Schumacher
ATTORNEY 3,061,734
WELL LOGGING CALIPER MOTOR CONTROL SYSTEM
Marshall B. Broome, Tulsa, Okla., assignor, by mesne assignments, to Dresser Industries, Inc., Dallas, Tex., a corporation of Delaware
Filed Sept. 11, 1959, Ser. No. 839,417
3 Claims. (Cl. 307—22)

The present invention relates to motor control switches and more particularly to a motor control circuit employed to expand and to retract, selectively, the arms of a calipering mechanism of a well logging tool.

In the art relating to prospecting for new sources of crude oil many tests have been devised for determining the properties of various substrata in the particular region under investigation, which properties permit the trained observer to predict the probability of the presence or absence of crude oil. One such test which is widely performed and from which the trained observer can obtain a considerable amount of information concerning the nature of the borehole and of the subsurface strata in a particular location is the measurement of the diameter of the well by means of appropriate caliper tools. Such measurements are usually performed by calipering tools having one or more arms extending outwardly from the tool and into contact with the wall of the well. The relative outward extension of the arm or arms is converted into an electrical or other suitable signal for transmission from the calipering tool to the surface where it is recorded as a function of well depth to produce a log of the well.

Due to the non-uniformity of the diameter of the well and to the fact that the angle of the well may vary greatly from the vertical, the descent of the well tool into the well is not normally uniform with time. Therefore, a well log cannot be produced during descent of the tool and such a log is normally produced while the tool is being withdrawn from the well. The caliper arms, if permitted to extend outwardly from the tool during descent thereof, would seriously hinder if not absolutely prohibit its descent into the well and in order to overcome such difficulties a calipering instrument has been developed in which the arms are selectively expandable and retractable. There have been caliper tools in which the arms were held in during descent, but once released the arms could not be retracted and the tool had to be withdrawn from the borehole should the arms be accidentally extended prematurely or in the event it was desired to lower the tool to repeat a measure. The retractable tool of the present invention overcomes these difficulties. The structure of such a tool, which permits selective expansion and contraction of its caliper arms, forms the subject matter of co-pending application Serial No. 838,205, filed on September 4, 1959, by William A. Camp, and entitled Retractor Device for Oil Well Logging Tool.

In the aforesaid application there is described a calipering tool having a bow spring caliper secured to a tool casing in which electronic instruments for determining other properties of strata investigated are disposed. The driving mechanism for selectively expanding and contracting the bow spring is contained in a further tool casing secured to the electronic instrumentation casing and disposed vertically thereabove. The bow spring has its upper end pivotally secured to the electronic instrumentation casing and the lower end of the bow spring is pivotally secured to a collar which is slidable on the electronic instrumentation casing. A cable is secured to the center of the bow spring and passes under a sheave secured to the casing in the region of the center of the bow spring and under a sheave rotatably mounted on the pivot pin for the upper end of the bow spring. This cable attaches to a rod which passes through a packing into the interior of the drive mechanism housing and in one embodiment of the aforesaid application is secured to one end of a constant tension spring the other end of which is wound on a drum which is rotatable by a first shaft secured to one member of a lost motion coupling. The first shaft drives a potentiometer through suitable gearing so that the resistance of the potentiometer located within the electronic instrumentation housing is always a function of the position of the caliper arm relative to the wall of the electronic instrumentation casing. Consequently, when the caliper arm is expanded into contact with the surface of the well and the tool is hoisted up the borehole the variations in position of the caliper arm relative to the casing are transmitted through the cable and the constant tension spring to the potentiometer.

The lost motion coupling comprises a second member which is coupled to a shaft of a two-phase, alternating current electric motor through a suitable gear reduction unit. The lost motion coupling is employed to permit rotation through a limited angle of the first shaft with movement of the caliper even though the motor shaft is stationary and to permit rotation of the motor shaft through a limited angle even though the first shaft is stationary. This second condition arises, for instance, when the caliper is initially retracted and it is desired to permit it to expand. The motor is energized to rotate in one direction and continues to rotate in that direction until a set of limit switches are actuated. However, the caliper arm may discontinue moving due to engagement with the wall of the well prior to the motor attaining a requisite degree of rotation to actuate the limit switches and therefore relative movement between these two aforesaid shafts must be permitted. Likewise, upon retracting the caliper, the motor shaft rotates until it has rotated through a sufficient distance to pick up the first shaft which senses the position of the caliper arm and then retracts the caliper.

The cables which communicate between the surface and the well tools in well surveying apparatus are normally relatively low current cables due to considerations of size and weight relative to the depth of the well bore and therefore length of the cable. It has been found therefore, that it is necessary to disable the power to the electronic measuring circuits during intervals when the motor is energized and conversely to disconnect the motor from the cable when the electronic circuits are being employed. Further selective energization of the motor in one direction to permit expansion of the caliper or in the opposite direction to retract the caliper must be under the control of an operator at the surface, as also must be the selective connection of the motor and electronic equipment to the cable.

It is therefore an object of the present invention to provide a control circuit which permits an operator at the surface of a well to control rotation of an electric motor in the well either clockwise or counterclockwise and further to permit selective coupling of alternating current energy to the cable to effect rotation of the motor or direct current to the cable to effect energization of electronic circuits.

It is another object of the present invention to provide a control circuit for an A.C. motor located in a well surveying tool employing circuits located at the surface of the well for controlling the selective application of alternating current and direct current to a cable employed to supply electric power to the well tool and employing down-well circuits which respond to the transmission of a control pulse from the surface station and to the position of the A.C. motor relative to two limits of rotation to control the application of the alternating current to the motor and the direct current to electronic surveying instruments.

In accordance with the present invention there is provided a control circuit at a ground station employing a plurality of switches. A first switch having a "log" and a "motor" position connects a high direct potential to the cable when the switch is in a log position and connects a dummy load across the source of direct potential when the switch is in a motor position. A second switch is provided which is ganged with the first switch so that when the first switch is in the log position, the second switch prevents the application of alternating current to the cable and when in a motor position applies alternating current to a third switch. A three-pole, two position switch is connected between the first and second switches and when it is in a first position and the other two switches are in the motor position, alternating current is applied to the cable. When this latter switch is in its first position it also applies direct potential to charge a capacitor and when it is moved to its second position while the first two switches are in the motor position, the alternating current is disconnected from the cable and the capacitor is discharged therethrough.

In consequence, the surface control circuits are employed to selectively and alternatively apply direct and alternating current to the cable and also to apply a large negative voltage pulse to the cable at a time when all other voltages are removed therefrom.

The apparatus within the well tool itself includes the electronic measuring circuits and the alternating current motor. When alternating current is applied to the cable, it is coupled to the alternating current motor to cause it to rotate in a first direction under an assumed initial set of circumstances. The motor actuates a plurality of limit switches when it reaches a predetermined limit of rotation in one direction and when these switches are actuated, they change the circuits such that the cable is now electrically connected to the electronic circuits. This condition is indicated by a meter at the surface and at this time the first two mentioned switches in the surface control circuitry may be actuated to the log position so that direct current is applied to the cable at the top of the well, and at the bottom of the well it is applied from the cable to the electronic circuitry. If it is assumed that initially the motor was energized to expand the caliper to institute a calipering operation, then the application of the direct current to the electronic circuits permits the measurement of the position of the caliper through the intermediary of the aforementioned potentiometer and the transmission of this information to the surface.

When it is desired to terminate a measuring or calipering operation and to retract the calipers, the two first mentioned switches at the surface are thrown to the motor position and the third mentioned switch is actuated to its second position so as to discharge the capacitor through the cable. This voltage pulse is employed at the well tool to actuate a solenoid which switches the circuits to bypass the open first mentioned limit switches and reverses the phase of the voltage applied to one winding of the motor so that when alternating current is subsequently applied to the cable the motor is energized in such a manner as to rotate in a direction opposite to the initial direction of rotation. Such rotation of the motor continues until it reaches a second predetermined limit of counterclockwise rotation. When the motor attains this limit of rotation it operates a second plurality of limit switches which change connection so that the cable is disconnected from the motor and connected to the electronic circuits. This condition is again sensed at the surface and the first and second switches may be thrown to a log position to apply direct current to the cable to energize the electronic circuits. The calipers are now retracted and if it is again desired to extend the calipers, the third switch at the surface is thrown to its second position to apply a pulse to the cable so that connections are again made from the cable to the alternating current motor to energize it for rotation in its first direction. The third mentioned switch at the surface therefore serves as a reversing switch in that upon the application of a voltage pulse from a capacitor to the cable as a result of actuation of this third switch, circuit connections in the well tool are changed so as to effect rotation of the motor in a direction opposite to rotation during its immediately preceding energized interval.

It is therefore another object of the present invention to provide a control circuit for a motor located in a well tool having a surface station for selectively applying direct current or alternating current to a well tool cable and for applying voltage pulses to the cable to effect reversal of the direction of rotation of the motor.

It is another object of the present invention to provide a control circuit for a motor located in a well tool which control circuit includes a circuit in the well tool responsive to the position of the motor relative to two limits of rotation to connect a well cable to electronic circuits and responsive to a voltage pulse received from circuits located at the surface to reconnect the cable to the alternating current motor.

Figure 2:
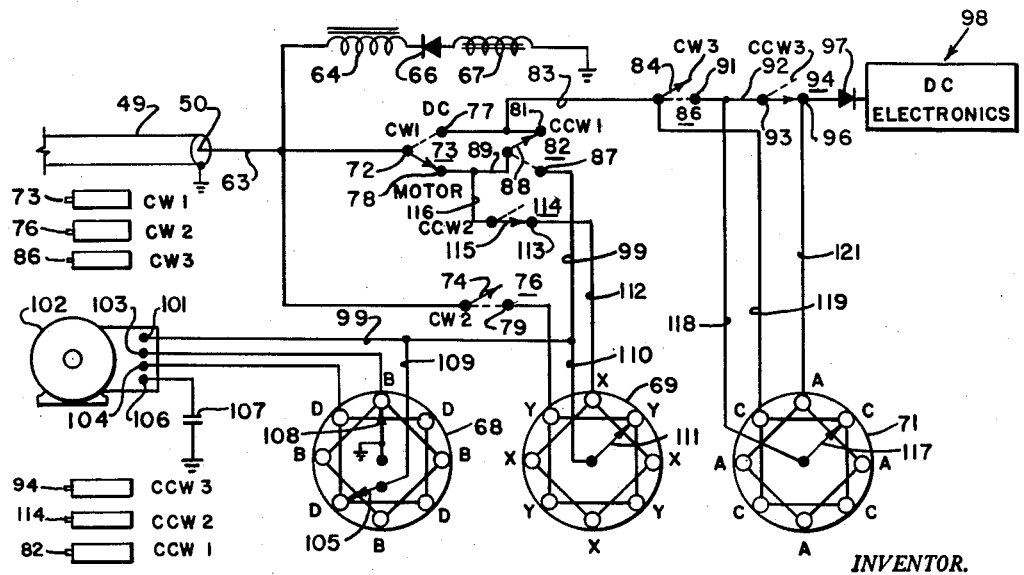

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic wiring diagram of the portion of the motor control circuit located at the surface; and FIGURE 2 is a schematic wiring diagram of a portion of the motor control circuit located in the well tool.

Referring specifically to FIGURE 1 of the accompanying drawings there is illustrated the switch control circuit which is situated above ground at the top of a well. A pair of terminals 1 and 2 are connected across a source of 110 volt, 60 cycle, alternating current. The terminal 1 is connected via a lead 3 to one end of a winding 4 of an autotransformer 6 having a variable tap 7. The other end of the winding 4 of the autotransformer 6 is connected via a lead 8 to a stationary contact 9 of a switch 11 having a second stationary contact 12 and a movable contact 13. The movable contact 13 is connected to the aforesaid A.C. input terminal 2. A resistor 14 and neon lamp indicator 16 are connected in series between the leads 3 and 8 and resistor 17 and neon lamp indicator 18 are connected in series between the lead 3 and the stationary contact 12 of the switch 11. The indicator lamps 16 and 18 are employed to indicate to the operator the position of the switch 11 and other switches ganged thereto as will be described subsequently.

A primary winding 19 of a transformer 21 having a secondary winding 22 is connected between the movable contact 7 of the autotransformer 6 and the lead 8. The secondary winding 22 of the transformer 21 has one end connected to ground and the other end connected through an operating winding 23 of a solenoid having a pair of contacts 24 connected in series with the winding 23. The contacts 24 are also connected in series with an ammeter 26 and a volt meter 27 to ground. The contacts 24 are shunted by a normally open switch 28 which may be employed to by-pass the contacts 24 in order to energize the solenoid 23 when the contacts 24 are initially open.

Thus far, it is apparent that when the movable contact 13 of the switch 11 engages the stationary contact 9, alternating current is developed across the secondary winding 22 of the transformer 21, and upon the momentary closing of the switch 28, a circuit is completed through the solenoid 23 so that it closes its associated contacts 24 and therefore establishes a holding circuit for the contacts through the secondary winding 22, the relay winding 23, the contacts 24, the meter 26 and the subsurface circuitry.

A movable contact 29 of a switch 31, having stationary contacts 32 and 33, is connected to the junction of the meters 26 and 27. The stationary contact 33 is unconnected. The stationary contact 32 is connected to a stationary contact 34 of a triple pole, two position switch 36. The switch 36 is biased to the position illustrated in FIG. 1 and may be momentarily actuated to its other position. A movable contact 37 is associated with the stationary contact 34 and a further stationary contact 38. The movable contact 37 is connected via a lead 41 to a stationary contact 42 of switch 43 having a second stationary contact 44 and a movable contact 46. The stationary contact 44 of the switch 43 is connected to ground through a resistor 47 while the movable contact 46 is connected to a terminal 48 of a source of positive direct voltage which serves as a B+ source for the electronic circuitry in the well and to charge capacitor 56.

The lead 41 is also connected to the center conductor 50 of a cable 49 which carries electric current to the down-well tools and to a stationary contact 51 of the switch 36. The stationary contact 51 is associated with a movable contact 52 and a second stationary contact 53. The stationary contact 53 is connected to ground through a resistor 54 and the movable contact 52 is connected through a capacitor 56 to a third movable contact 57 of the switch 36. The movable contact 57 is associated with a stationary contact 58 connected to ground and a second stationary contact 59 connected via a lead 61 to the B+ terminal 48. The switches 11, 31 and 43 are all ganged so that each of the switches simultaneously assume the "motor" or "log" positions as indicated in FIGURE 1 opposite the stationary contacts of each of the switches. If the switches 11, 31 and 43 are in the positions illustrated, B+ voltage, applied to the terminal 48, is coupled via the lead 61, stationary contact 59, movable contact 57 to one end of the capacitor 56, the other end of which is connected to ground via the movable contact 52, stationary contact 53 of the switch 36 and resistor 54. Simultaneously, positive voltage is coupled via the movable contact 46 and stationary contact 42 of the switch 43 to the cable 49 for application to the electronic circuitry down-well. If the switches 11, 31 and 43 are thrown to the "motor" position alternating current is coupled via the movable contact 29 and stationary contact 32 of the switch 31 to the stationary contact 34 of the switch 36 and via the movable contact 37 of the switch 36 and lead 41 to the cable 49. Concurrently, a load resistor 47 is connected across the high voltage source via the movable contact 46 and stationary contact 44 of the switch 43.

Proceeding now to a description of the down-well apparatus illustrated in FIGURE 2 of the accompanying drawings, the center conductor 50 of the cable 49 is connected to a lead 63 in the well logging instrument. The lead 63 is connected to ground through a series circuit comprising an alternating current choke 64, a diode 66 and a winding 67 of a rotary solenoid having three wafers 68, 69 and 71 each adapted to have wipers rotated through a predetermined arc relative thereto each time a pulse of energy is applied to the winding 67. The cable 63 is also connected to a movable contact 72 of a first clockwise limit switch 73 and a movable contact 74 of a second clockwise limit switch 76. The first clockwise limit switch 73 is provided with stationary contacts 77 and 78 while the clockwise limit switch 76 is provided with a single stationary contact 79. The contact 77 is connected to a stationary contact 81 of a first counterclockwise limit switch 82 and also via a lead 83 to a movable contact 84 of a third clockwise limit switch 86. The first counterclockwise limit switch 82 is further provided with a second stationary contact 87 and a movable contact 88 connected via a lead 89 to the stationary contact 78 of the first clockwise limit switch 73. The third clockwise limit switch 86 is provided with a stationary contact 91 connected via a lead 92 to a movable contact 93 of a third counterclockwise limit switch 94 having a stationary contact 96. The stationary contact 96 is connected via a diode 97 to the electronic circuitry, generally designated by the reference numeral 98, of the well logging equipment. The stationary contact 87 of the first counterclockwise limit switch 82 is connected via a lead 99 to a first terminal 101 of a two-phase, alternating current, caliper retraction motor 102. A second input terminal 103 of the motor 102 is connected to all of the "B" contacts of the wafer 68 which are in staggered relationship with "D" contacts about the periphery of the wafer. The "D" contacts are all connected to a third input terminal 104 to the motor 102 while a fourth terminal 106 of the motor is connected through a phase shifting capacitor 107 to ground.

The wafer 68 is associated with rotatable wipers 105 and 108 which are rotated each time the solenoid winding 67 is energized to sequentially and successively contact the "B" and "D" contacts of the wafer 68. The wipers 105 and 108 are always in contact with a different set of the contacts "B" and "D" and constitute the motor reversing switch of the apparatus. The lead 99 is connected via a lead 109 to a wiper 105 while the wiper 108 is grounded.

The lead 99 is further connected via a lead 110 to a wiper 111 associated with the wafer 69 which is provided with groups of alternate X and Y contacts with the contacts of each group being electrically interconnected. The Y contacts are connected to the stationary contact 79 of the second clockwise limit switch 76 and the X contacts are connected via a lead 112 to a stationary contact 113 of a second counterclockwise limit switch 114 having a movable contact 115 connected via a lead 116 to the lead 89.

The wafer 71 is associated with a wiper 117 adapted to sequentially and successively engage A and C contacts of the wafer 71. The wiper 117 is connected via a lead 118 to the lead 92 while the C contacts are connected via a lead 119 to the lead 83. The A contacts are connected via a lead 121 to the stationary contact 96 of the third counterclockwise limit switch 94.

The clockwise limit switches 73, 76 and 86 are all operated simultaneously when the motor 102 has rotated clockwise through a predetermined arc from its counterclockwise limit of rotation and similarly, the counterclockwise limit switches 82, 94 and 114 are operated simultaneously when the motor 102 has rotated counterclockwise through a predetermined arc from its clockwise limit of rotation. The limit switches are shown in the position attained when the motor reaches its counterclockwise limit of rotation. The counterclockwise limit switches 82, 94 and 114 assume positions opposite to those illustrated after a few degrees of clockwise rotation of the motor shaft and the clockwise limit switches 73, 76 and 86 assume positions opposite to those illustrated only when the motor is at an oppostie limit of rotation. The mechanism for insuring that all of the switches of each group; that is, the clockwise switches and the counterclockwise switches, are operated simultaneously is described in the aforesaid co-pending application of William A. Camp.

In describing the operation of the apparatus, it is assumed initially that the caliper tool is at the bottom of the well, the caliper is retracted and that the motor must be rotated clockwise in order to permit the caliper to expand. All elements of the apparatus are initially in the positions illustrated in FIGURES 1 and 2 and in order to initiate operation of the motor to permit expansion of the caliper, the switches 11, 31 and 43 are moved to their motor positions. The switch 36 is now momentarily actuated to a position opposite to that illustrated and the capacitor 56 is discharged through the coil 67. The wafers 68, 69 and 71 are rotated one step and a motor circuit is established for rotating the motor clockwise. The limit switch 86 is now open and the wiper 117 engages an A contact of wafer 71 so that A.C. voltage cannot be applied to the electronic circuit 98.

After switch 36 returns to its normal position, the closing of the switch 11 causes voltage to be developed across the secondary winding 22 of the transformer 21 and the switch 28 is now closed to energize the relay 23. In consequence, an alternating voltage is applied to the cable 49 and appears on the lead 63. The alternating current appearing on the lead 63 is applied via the first clockwise limit switch 73 to the lead 89, via lead 116, switch 114, lead 112 to the X contacts of wafer 69, wiper 111 and lead 110 to the lead 99. The lead 99 is connected to the first input terminal 101 of the motor 102. The alternating current appearing on the lead 99 is also applied via the lead 109, the wiper arm 105 and the B contacts of the wafer 68 to the second input terminal 103 of the motor 102. Thus, the two windings of the motor 102 are energized with the capacitor 107 providing the necessary phase shift for operating the motor as a two-phase unit.

The motor 102 rotates clockwise and the limit switches 94 and 114 open while at the same instant the movable contact 88 of switch 82 engages contact 87, but this does not disturb the rotation of motor. The motor continues to rotate until the limit switches 73, 76 and 86 are actuated and their respective movable contacts 72, 74 and 84 assume the dotted line positions illustrated in FIGURE 2. At this time the alternating current is removed from the motor 102 and the lead 63 is connected to the electronic circuits 98 via the switch 73, lead 83, limit switch 86, lead 118, wiper 117 and contacts A of the wafer 71, lead 121 and diode 97. The diode 97 prevents damage to the electronic circuits 98 by the negative voltage fed down cable to actuate Ledex solenoid. Actually, as soon as the motor is removed from the circuit, the solenoid 23 opens the contacts 24 and A.C. is removed from the cable. The switches 11, 31 and 43 may be moved back to the "log" position as illustrated in FIGURE 1, and a direct voltage for energizing the electronic circuits 98 is applied to cable 49.

At the end of a logging operation when it is desired to retract the calipers, initially the switches 11, 31 and 43 are switched to the motor position but alternating current is not applied to the cable 49 since contacts 24 are open. The switch 36 is now actuated so that the movable contacts 37, 52 and 57 engage the stationary contacts 38, 51 and 58, respectively. It will be noted that when the switch 36 is in the position illustrated in FIGURE 1, the capacitor 56 is connected between the B+ terminal 48 and ground and therefore is charged to the value of the B+ voltage which for purposes of example may be 250 volts. When the switch 43 is in the motor position and the switch 36 is moved to its upper position, as just described, the positive terminal of the capacitor 56; that is, the upper terminal as viewed in FIGURE 1, is returned via the movable contact 57 and stationary contact 58 of the switch 36 to ground whereas the negative terminal is connected via the movable contact 52, the stationary contact 51 to the lead 41 then to cable 49. In consequence, the capacitor discharges and a large negative voltage pulse is applied to the cable 49. This pulse of approximately 250 volts is sufficiently large even though attenuated by the inductor 64 to energize the coil 67 of the rotary solenoid and step the wafers 68, 69, and 71 one position clockwise to the position illustrated in FIGURE 2. Thus, the wipers 105 and 108 of wafer 68 engage D and B contacts, respectively, the wiper 111 of the wafer 69 engages a Y contact, the wiper 117 of the wafer 71 engages a C contact. It will be noted that the diode 97 is poled oppositely to the diode 66 and therefore the negative stepping pulse for the solenoid coil 67 is not applied to the electronic circuits 98 while the diode 66 prevents positive direct voltage applied to the electronic circuits from affecting the solenoid 67.

After operation of the solenoid, the switch 28 is temporarily closed so that alternating current is again applied to the cable 49. Since the motor 102 is at its clockwise limit of rotation, the alternating current is applied via lead 63 and the limit switch 76 to the Y contacts of the wafer 69 and via the wiper 111, lead 110 and lead 99 to the terminal 101 of the motor 102. The lead 99 is also coupled via the lead 109, wiper 105, and the D terminals of the wafer 68 to the terminal 104 and the terminal 103 is connected via the B contacts and wiper 108 to ground. It will be noted that under the conditions just described the terminal 104 is connected to the alternating current lead and the terminal 103 is grounded. This reversal of connections produces a reversal of the direction of rotation of the motor 102.

When the motor 102 has rotated a very few degrees, the limit switches 73, 76 and 86 assume the position illustrated in FIGURE 2 but this does not affect the rotation of the motor 102. More particularly, the motor circuit is maintained through switches 73 and 82 to lead 99 even though the circuit through switch 76, wiper 111, contacts Y of wafer 69, and lead 110 is opened. At this time the re-opening of the third clockwise limit switch 86 has no effect upon the circuit. The motor continues to rotate counterclockwise until it reaches a predetermined limit of rotation as determined by the position of the counterclockwise limit switches 82, 94 and 114 at which time the movable contacts of these switches again assume the full line positions illustrated in FIGURE 2. The circuit from the lead 63 to the lead 99 is now open, the lead 63 being switched by the limit switch 82 to the lead 83. The lead 83 is connected via the contacts C and the wiper arm 117 of the wafer 71, and the lead 118 to the lead 92. Since the third counterclockwise limit switch is closed the lead 92 is connected to the electronic circuits 98. Thereafter, by moving the switches 11, 31 and 43 of FIGURE 1 to the "log" position direct current is again applied to the electronic circuits 98.

When it is again desired to effect clockwise rotation of the motor 102 in order to permit the caliper to expand, the switch 36 is actuated and the process repeated.

The rotary solenoid, although preferable in the environment contemplated, is not essential to the operation of the apparatus and may be replaced by a three-pole, double-throw switch actuated by a solenoid. Conversely, the three-pole, two position switch 36 may be replaced by a wafer switch.

While I have described and illustrated one specific embodiment of my invention, it will be clear that variations of the details of construction which are specifically illustrated and described may be resorted to without departing from the true spirit and scope of the invention as defined in the appended claims.

I claim:

1. A motor control circuit comprising a first lead, a second lead, means for applying direct current to said first lead, a first switch means for connecting said first lead to said second lead, a third lead, means for applying alternating current to said third lead, a second switch means having a first and a second position, a capacitor, said second switch means connecting said capacitor to said first lead and said third lead to said second lead when in said first position and for connecting said capacitor to said second lead when in said second position.

2. A motor control circuit comprising a first lead, means for coupling direct current to said first lead, a second lead, a first switch means having a first and a second position, said first switch means connecting said first lead to said second lead when in said first position, a third lead, means for coupling alternating current to said third lead, a fourth lead, said first switch means connecting said third lead to said fourth lead when in said second position, a capacitor, a second switch means having a first and a second position, said second switch means connecting said capacitor to said first lead and said fourth lead to said second lead when in said first position and for connecting said capacitor to said second lead when in said second position.

3. A motor control circuit comprising a first lead, a second lead, means for applying direct current to said first lead, a first switch means for connecting said first lead to said second lead, a third lead, means for applying alternating current to said third lead, a pulse voltage source, a second switch means having a first and a second position, said second switch means connecting said third lead to said second lead when in said first position and for connecting said pulse voltage source to said second lead in said second position.

References Cited in the file of this patent

UNITED STATES PATENTS

| | | |
|---|---|---|
| 1,778,026 | Grob | Oct. 14, 1930 |
| 2,098,069 | Stewart | Nov. 2, 1937 |
| 2,194,822 | Dannheiser | Mar. 26, 1940 |
| 2,435,440 | Graham | Feb. 3, 1948 |
| 2,674,701 | Maseritz | Apr. 6, 1954 |
| 2,703,053 | Castel | Mar. 1, 1955 |
| 2,851,648 | Reger | Sept. 9, 1958 |